(12) United States Patent
Smakman et al.

(10) Patent No.: US 12,459,646 B2
(45) Date of Patent: Nov. 4, 2025

(54) GALLEY INSERT SYSTEM

(71) Applicant: B/E Aerospace, Inc., Winston-Salem, NC (US)

(72) Inventors: Robert Jhon Smakman, Houten (NL); Frederik Adrian Stephan Panjer, Maarsbergen (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 161 days.

(21) Appl. No.: 18/334,227

(22) Filed: Jun. 13, 2023

(65) Prior Publication Data

US 2024/0002055 A1 Jan. 4, 2024

(30) Foreign Application Priority Data

Jun. 29, 2022 (EP) .................................... 22182059

(51) Int. Cl.
B64D 11/04 (2006.01)
(52) U.S. Cl.
CPC ................... B64D 11/04 (2013.01)
(58) Field of Classification Search
CPC ..................... B64D 11/04; B64D 2011/0046
See application file for complete search history.

(56) References Cited

U.S. PATENT DOCUMENTS

| | | | |
|---|---|---|---|
| 3,912,206 A | 10/1975 | Jong | |
| 5,236,153 A | 8/1993 | Laconte | |
| 6,318,672 B1 | 11/2001 | Traylor | |
| 7,954,761 B2 | 6/2011 | Johnson et al. | |
| 8,322,654 B2 | 12/2012 | Gomes et al. | |
| 8,776,353 B2* | 7/2014 | Herzog | B64D 11/003 244/129.5 |
| 8,814,087 B2* | 8/2014 | Koschberg | B64D 11/04 244/118.5 |
| 9,254,919 B2 | 2/2016 | Schootstra et al. | |
| 9,802,704 B2* | 10/2017 | Young | B64D 11/04 |
| 10,065,748 B2 | 9/2018 | Forbes | |
| 10,137,987 B2* | 11/2018 | Burd | B62B 5/0447 |
| 11,021,254 B2 | 6/2021 | Swanson et al. | |
| 11,235,879 B2 | 2/2022 | Elshaw et al. | |
| 11,273,915 B2 | 3/2022 | Rowe et al. | |
| 2012/0217342 A1* | 8/2012 | Tan | B64D 11/04 244/118.5 |

(Continued)

FOREIGN PATENT DOCUMENTS

DE 102007036449 2/2009

OTHER PUBLICATIONS

European Patent Office, European Search Report dated Dec. 8, 2022 in Application No. 22182059.0.

*Primary Examiner* — Bradley Duckworth
(74) *Attorney, Agent, or Firm* — SNELL & WILMER L.L.P.

(57) ABSTRACT

A galley insert system for an aircraft galley comprises a galley support structure, a galley insert configured to be coupled to the support structure, and a latch mechanism for coupling the insert to the support structure, the latch mechanism configured to automatically engage to couple the insert to the support structure when the insert is moved into a latching position on the support structure, wherein the latch mechanism comprises a control mechanism configured to be actuated to disengage the latch mechanism.

15 Claims, 14 Drawing Sheets

(56) References Cited

U.S. PATENT DOCUMENTS

2013/0200123 A1* 8/2013 Orozco .................. B60R 11/00
224/485
2019/0210730 A1 7/2019 Riedel et al.

* cited by examiner

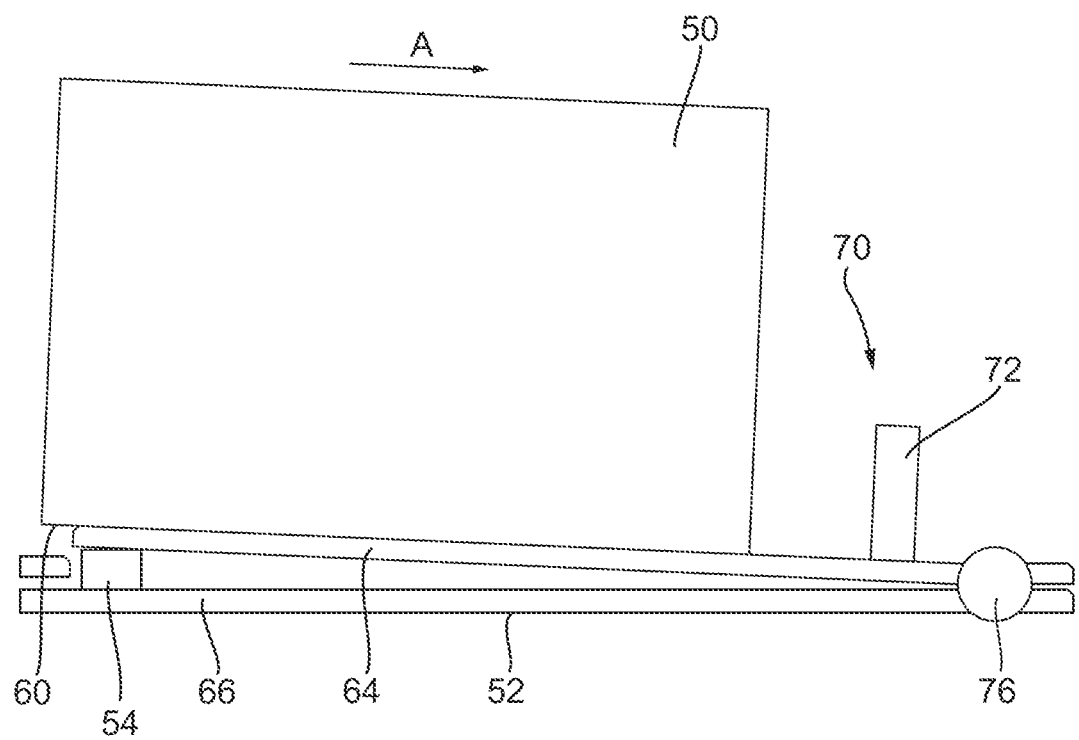

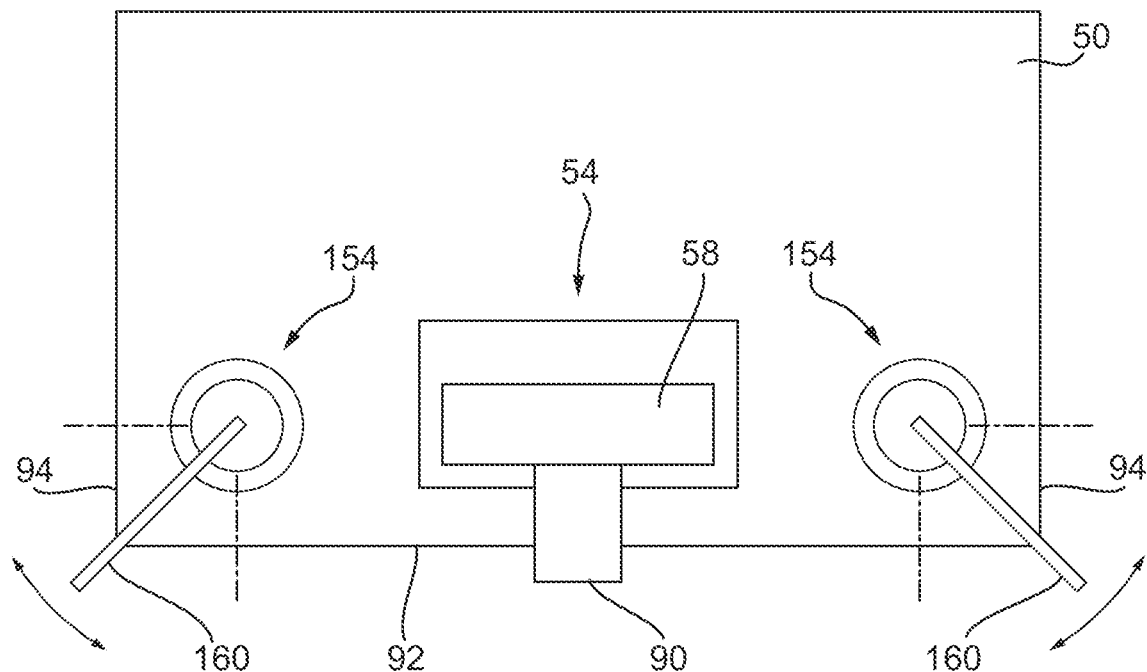

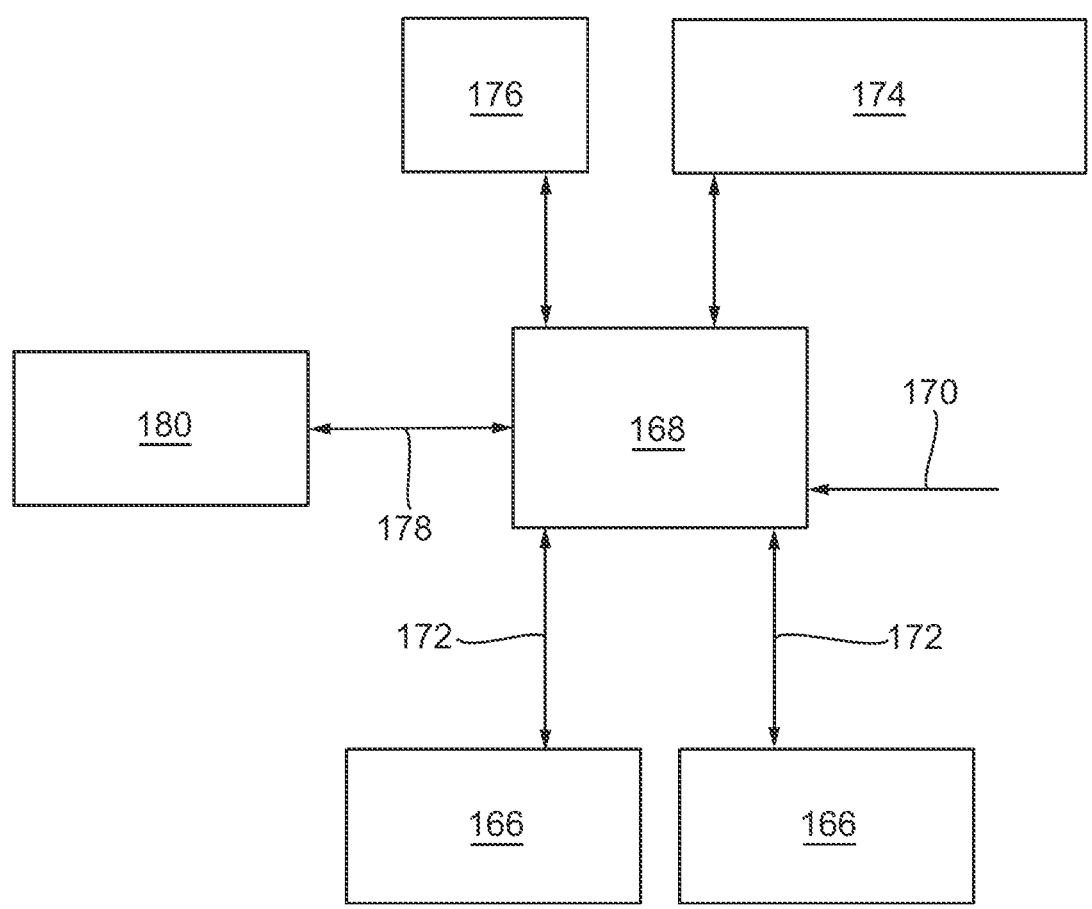

GALLEY INSERT SYSTEM

CROSS-REFERENCE TO RELATED APPLICATIONS

This application claims priority to, and the benefit of, EP Patent Application No. 22182059.0, filed Jun. 29, 2022 and titled "GALLEY INSERT SYSTEM," which is incorporated by reference herein in its entirety for all purposes.

FIELD

This disclosure relates to galley inserts for aircraft galleys and systems for securing a galley insert in an aircraft galley.

BACKGROUND

Aircraft galleys include various inserts for storing and preparing food and drinks, such as ovens, refrigerators, boilers, coffee makers, etc. Due to the forces experienced on board an aircraft, such as during take off and landing or during turbulence, it is important for the interior fittings to be safely and firmly secured within the aircraft.

Conventionally, galley inserts are installed within aircraft galleys by securing an insert to a support structure or worktop using screws that extend from beneath the galley worktop, through holes in the worktop and into holes in the base of the galley insert.

However, the conventional ways of securing galley inserts create problems in installing or removing an insert, for example for maintenance, cleaning or replacement, because of difficulties in accessing and aligning the holes and screws from beneath the worktop and insert. The holes are often not visible, so the precise alignment between holes in the galley worktop and holes in the bottom of the insert that is required for inserting screws can be difficult to achieve. An added problem is that each attachment screw needs to be installed upside-down underneath the worktop.

Removing a galley insert can also be made more difficult if the heads of the screws securing the insert get damaged or break due to corrosion by moisture and dirt that may find its way beneath the insert, for example in the case of an oven installed with its base at sink-top level.

Furthermore, to comply with safety regulations for aircraft fittings, every component that is used to secure the galley insert needs to be certified and needs to be installed by a certified technician.

Therefore, installing and removing a galley insert can be onerous and time-consuming. However, a quick turn-around may be needed for the cleaning, checking and maintenance of an aircraft galley.

U.S. Pat. No. 10,065,748 discloses a linkage assembly that can be used to secure a galley insert to a galley work deck without using mounting screws.

A need exists to improve the ease and speed with which a galley insert can be installed and removed in an aircraft galley.

SUMMARY

An aspect of the present disclosure provides a galley insert system for an aircraft galley, the system comprising a galley support structure, a galley insert configured to be coupled to the support structure, and a latch mechanism for coupling the insert to the support structure, the latch mechanism configured to automatically engage to couple the insert to the support structure when the insert is moved into a latching position on the support structure. The latch mechanism may comprise a control mechanism configured to be actuated to disengage the latch mechanism.

The latch mechanism may be configured to couple a base of the insert to the support structure. In some embodiments, at least a portion of the control mechanism may be positioned beside the insert, on a side or front surface of the insert, on top of the insert or in front of the insert. That is, the at least a portion of the control mechanism may be positioned above or outside the base of the insert. The terms "beside", "side", "front", "above" and "top" as used herein are in relation to the orientation of the insert when installed for use in an aircraft galley.

The latch mechanism may comprise a first latch element and a second latch element configured to engage each other to couple the insert to the support structure, wherein the engagement position may comprise the first latch element being aligned with the second latch element.

The first latch element may be integrated with the galley support structure and/or the second latch element may be integrated with the galley insert.

One of the first and second latch elements may be movable between an engagement position and a disengaged position and is biased to the engagement position.

The first latch element may be configured to automatically move under gravity into engagement with the second latch element when the first latch element is aligned with the second latch element.

The second latch element may be movable between the engagement position and the disengaged position and may be biased to the engagement position by a spring force. When the insert is moved into the latching position, the second latch element may be configured to move from the engagement position to the disengaged position to receive and be aligned with the first latch element and then revert to the engagement position under the spring force to retain the first latch element to engage the latch mechanism.

The latch mechanism may be configured such that, when the insert is moved into the engagement position on the support structure, the first latch element moves the second latch element from the engagement position to the disengaged position.

The control mechanism may be configured to be actuated to move the second latch element against the spring force from the engagement to the disengaged position to disengage the latch mechanism. The latch mechanism may be configured such that the first latch element is automatically released from the second latch element when the second latch element moves to the disengaged position.

The insert may be biased by the support structure from the latching position to an unlatched position for removal of the insert from the support structure such that, when the latch mechanism is disengaged, the support structure automatically moves the insert to the unlatched position. The support structure may comprise a plate positioned above a base. The plate may be pivotally coupled to the base. The plate may be spring-loaded in the position above the base such that the insert can be positioned on the plate and the insert can be moved from the unlatched position to the latching position by lowering the insert and plate towards the base against the force of a spring between the plate and the base. When the latch mechanism is disengaged, the force spring between plate and the base automatically moves the insert and plate away from the base to the unlatched position.

The latch mechanism may comprise a retaining mechanism configured to selectively prevent the latch mechanism automatically engaging when the insert is in the latching position.

The latch mechanism may be a primary latch mechanism, and the system may further comprise at least one secondary latch mechanism. The secondary latch mechanism may be configured to be engaged after the primary latch mechanism has engaged. The secondary latch mechanism may be configured to automatically engage in response to a sensor signal indicating that the primary latch mechanism has engaged.

Another aspect of the present disclosure provides a method of operating the galley insert system, the method comprising placing the galley insert on the galley support structure moving the insert into the disengaged position on the support structure and automatically engaging the latch mechanism to couple the insert to the support structure.

Moving the insert into the disengaged position on the support structure may comprise aligning a first latch element with a second latch element such that the first and second latch elements automatically engage to couple the galley insert to the support structure. The first latch element may be integrated with the galley support structure and/or the second latch element may be integrated with the galley insert.

Aligning the first latch element with the second latch element may comprise moving the second latch element against a spring bias force.

The method may further comprise operating the control mechanism to disengage the latch mechanism and removing the galley insert from the support structure.

BRIEF DESCRIPTION OF THE DRAWINGS

One or more non-limiting examples will now be described, by way of example only, and with reference to the accompanying figures in which:

FIGS. 9A to 9C show schematic cross-sectional views of a galley insert in loading and installed positions according to a second embodiment of the present invention;

FIG. 12 shows a schematic cross-sectional view of a front portion of the galley insert of FIGS. 9A to 9C;

FIG. 15 is a block diagram showing a control system for a secondary latch mechanism.

DETAILED DESCRIPTION

Figure 1:
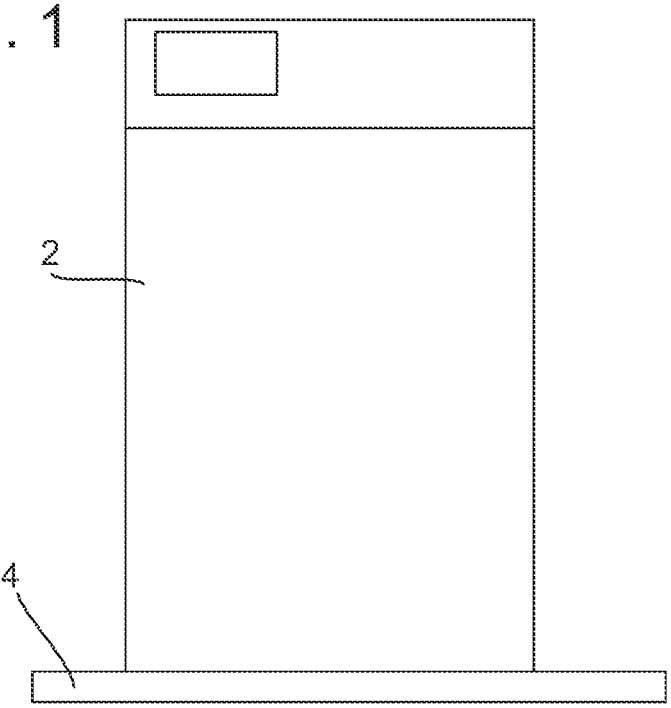
FIG. 1 shows a schematic front view of a galley insert.

Referring to FIG. 1, a galley insert 2, for example in the galley of an aircraft, is mounted on a support structure 4, such as a galley worktop 4. Installation of the galley insert 2 may include electrically coupling the insert 2 to electrical connections (not shown in FIG. 1) which may be located at the rear of the galley and installed insert 2 to provide electrical power to the galley insert 2. The galley insert 2 may be any of a variety of types of galley inserts, as will be appreciated by the skilled person. For example, the galley insert 2 may be an oven, a refrigerator, a boiler, a coffee maker, etc.

Figure 2:
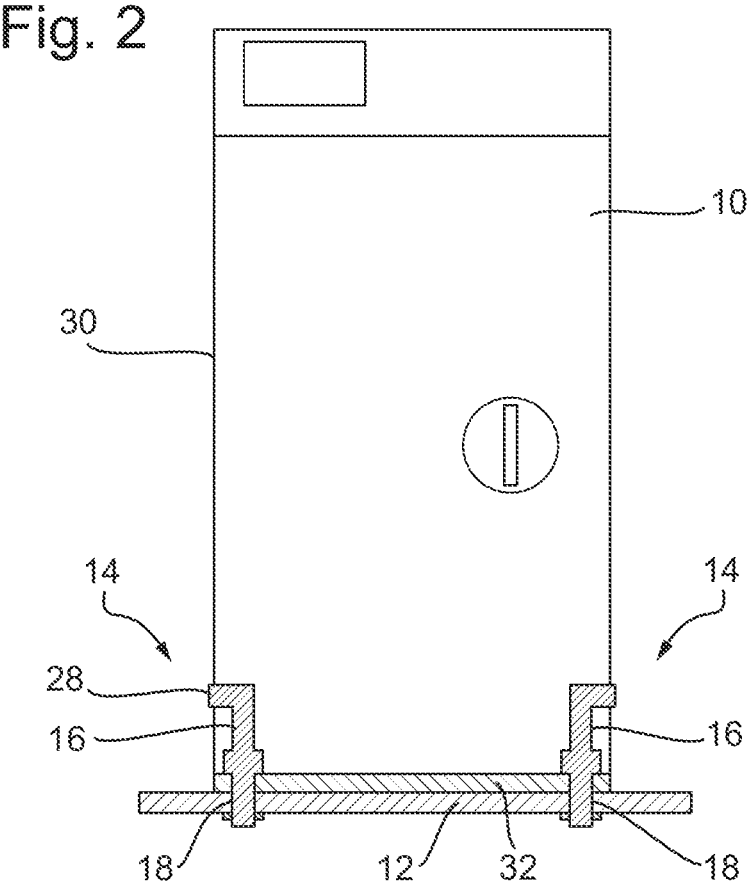
FIG. 2 shows a schematic front view of a galley insert according to a first embodiment of the present invention.
Figure 3A:
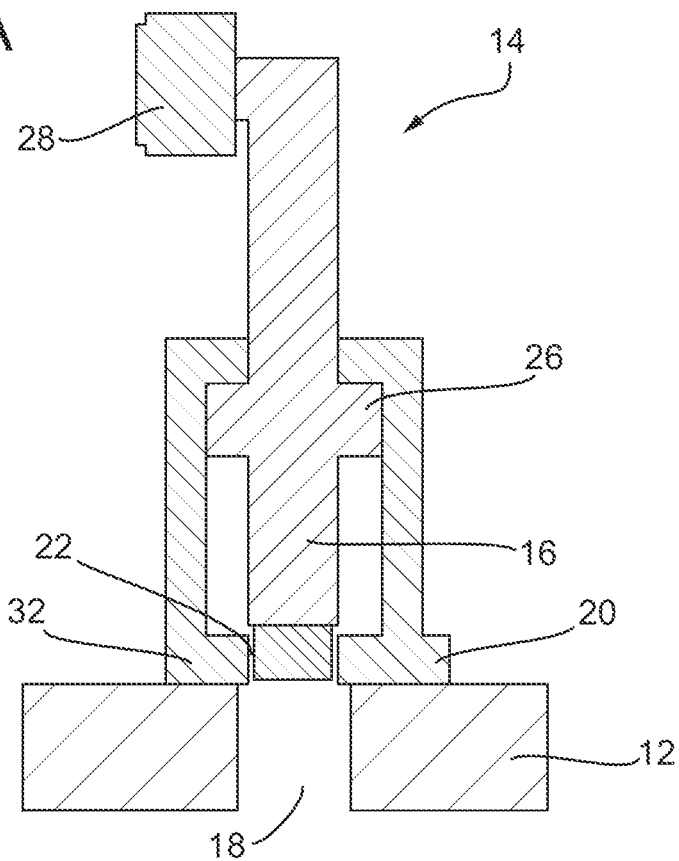
FIG. 3A shows a schematic cross-sectional view of a latch mechanism for the galley insert of FIG. 2 in a disengaged configuration.
Figure 3B:
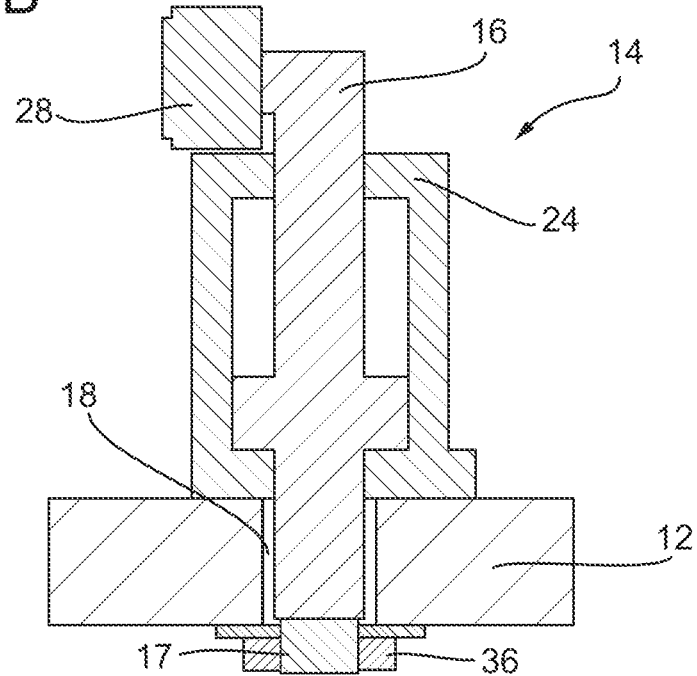
FIG. 3B shows the latch mechanism of FIG. 3A in an engaged configuration.
Figure 4:
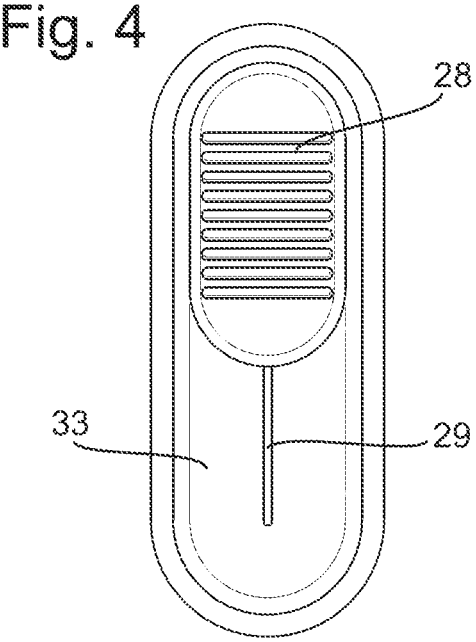
FIG. 4 shows a front view of a slider for the latch mechanism of FIG. 3A.

With reference to FIGS. 2, 3A and 3B, a galley insert 10 is secured to a galley support structure 12 by one or more latch mechanisms 14. The galley insert 10 and support structure 12 may correspond to the galley insert 2 and worktop 4 of FIG. 1. Two latch mechanisms 14 are shown in FIG. 2, but there may be only one latch mechanism 14 present, or more than two latch mechanisms 14 present. Each latch mechanism 14 may comprise at least a first latch element 16 and a second latch element 18. At least one of the first and second latch elements 16, 18 may be integrated with the insert 10 or the support structure 12. In this embodiment, the first latch element 16 is integrated with the insert 10 and the second latch element 18 is integrated with the support structure 12. The first latch element 16 and the second latch element 18 automatically engage with each other when the insert 10 is moved into a latching position on the support structure 12 to couple the insert 10 to the support structure 12. The automatic engagement means that no further intervention is required to engage the latch mechanism 14 once the insert 10 is moved into the latching position The first latch element 16 may comprise an attachment bolt 16 that is retained by the insert 10. The bolt 16 may be movable from a position inside the insert housing 20 (FIG. 3A) to a position at least partially extending outside the housing 20 (FIG. 3B). The base or bottom surface 32 of the insert housing 20 has an opening 22 to allow the bolt 16 to extend out of the housing 20. The insert 10 may comprise a bolt retainer 24 to hold the bolt 16 in place inside the base of the housing 20, as shown in FIGS. 3A and 3B.

The bolt 16 may be coupled to a control mechanism 28 to allow the position of the bolt 16 to be controlled. As shown in FIG. 2, the control mechanism 28 may extend to an exterior side surface 30 of the insert 10 which allows for easy access to the control mechanism 28 by a technician when the insert 10 is positioned on the support structure 12. The bolt 16 may comprise a flange 26 that is wider than the opening 22 to restrict the extension of the bolt 16 outside the housing 20, as demonstrated in FIG. 3B.

The second latch element 18 may comprise an opening 18 in the galley support structure 12 for receiving the bolt 16 when the bolt 16 extends out of the opening 22 in the insert housing 20. As can be seen in FIG. 3B, the lower end 17 of the extended bolt 16 may extend beyond a lower surface 34 of the support structure 12. A fastener 36, such as a nut, may be added to the lower end 17 of the bolt 16, which can be threaded, to further secure the bolt 16 and insert 10 to the support structure 12. The combination of the bolt flange 26 and the fastener 36 secured to the lower end 17 of the bolt 16 can compress a portion of the insert housing 20 surrounding the opening 22 to help firmly secure the insert 10 to the support structure 12.

The bolt 16 and opening 22 of the insert 10 may be designed such that the bolt 16 can fall at least partially out of the opening 22 under the force of gravity alone. This may be achieved by ensuring that the opening 22 is wide enough relative to the bolt 16 to reduce friction between the bolt 16 and housing 20 as the bolt 16 passes through the opening 22. This means that, when the galley insert 10 is placed on the support structure 12, the bolt 16 can fall into the support structure opening 18 under gravity once the insert 10 is in a latching position with the insert opening 22 and bolt 16 aligned with the support structure opening 18. Engagement of the latch mechanism 14 can be achieved by moving the insert 10 on the support structure 12 until the insert 10 is in the latching position, whereupon the bolt 16 will fall from a disengaged position inside the insert housing 22 into an engagement position extended out of the housing 22 and into the opening 18. FIG. 3A shows the latch mechanism 14 when the insert 10 is moved into the latching position, and FIG. 3B shows the engaged latch mechanism 14. The fastener 36 may subsequently be added to the lower end of the bolt 16 once the bolt 16 is extended through the support structure opening 18.

To disengage the latch mechanism 14, any fasteners 36 can first be removed, if present, then the bolts 16 can be raised by operating the control mechanism 28. In some embodiments, as shown in FIGS. 4 and 6A to 8, the control mechanism 28 comprises a mechanical slider 28, for example a plastic slider 28, coupled to the bolt 16. By sliding the slider 28 upwards along a slot 29, the bolt 16 is retracted out of the opening 18 of the support structure 12 and inside the insert housing 20.

A retaining mechanism 31 may be provided to selectively prevent the latch mechanism 14 automatically engaging when the insert 10 is in the latching position on the support structure 12. Because the bolt 16 is configured to extend out of the insert housing 20 under gravity, the retaining mechanism 31 also provides the advantage of being able to retain the bolt 16 against the force of gravity in the retracted, disengaged position inside the housing 20 when they are not needed, for example during handling and transport of the insert 10, to protect the bolts 16 and to prevent the bolts 16 from causing damage.

To retain the bolt 16 inside the housing 20 against the force of gravity, the retaining mechanism 31 may snap lock the slider 28 into place when the bolt 16 is in the retracted, disengaged position. For example, a detent may be provided near the top of the slider track to lock the slider 28 in place. In order to release the bolt 16 and allow the bolt 16 to extend from the housing 20 under gravity, the slider 28 can be operated to overcome the force of the detent to release the snap lock.

The slider 28 may be provided with colored or otherwise visible indicators to notify an operator whether the bolt 16 is in a retracted, disengaged position, or in an extended, engagement position. For example, a raised slider 28 may show a red color to indicate that the bolt 16 is retracted and disengaged and a lowered slider 28 may show a green color to indicate that the bolt 16 is in an extended, engagement position.

Figure 5:
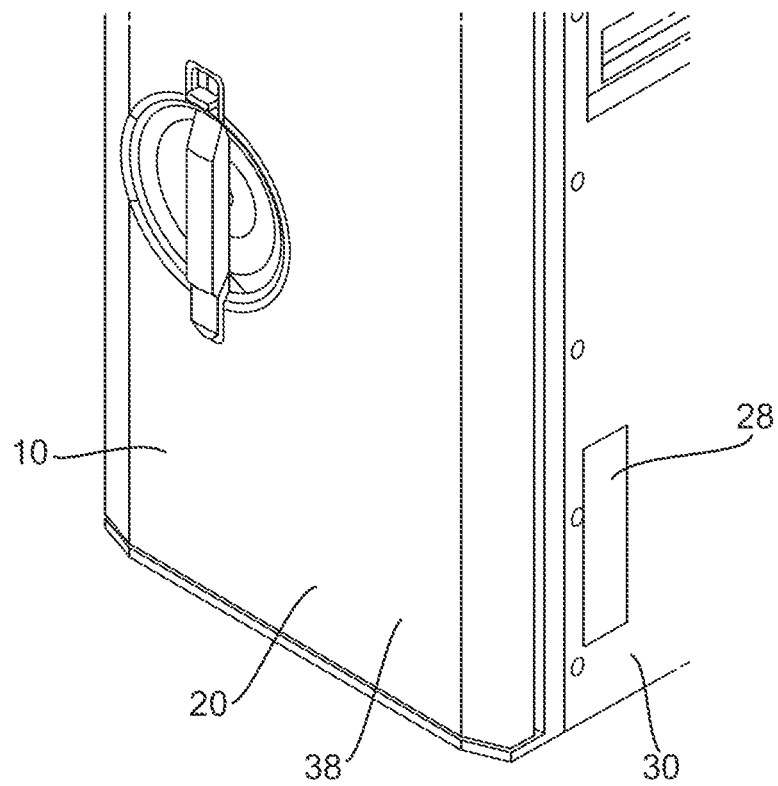
FIG. 5 shows a schematic partial perspective view of the galley insert of FIG. 2.

FIG. 5 shows an example location of the control mechanism 28 on the exterior side surface 30 of the insert 10. The slider 28 may be located on the side 30 of the insert 10 adjacent to the front surface 38 of the insert 10 so as to be easily accessible for quick and easy disengagement of the latch mechanism 14. The slider 28 may be flush with the surface of the insert 10 to reduce the risk of damage to the slider 28 or accidental operation of the slider 28. The control mechanism 28 may alternatively be located on the front surface 38 of the insert 10.

FIGS. 6A to 8 show an example embodiment of the slider 28 and a spring plunger retaining mechanism 31. The slider 28 is retained within a slot 29 of the slider housing 33 and can move in either direction along the slot 29. With the slider 28 in the position shown in FIG. 6A at the bottom of the slot 29, the bolt 16 is in the extended, engagement position, as shown in FIGS. 2 and 3B. When the slider 28 is moved along the slot 29 to raise the slider 28 to the position shown in FIG. 6B, the bolt 16 is in the retracted, disengaged position, as shown in FIG. 3A. The slider 28 may then be raised further to the top of the slot 29 as shown in FIG. 6C to lock the slider 28 so that the bolt 16 is retained in the retracted, disengaged position inside the insert housing 20. Alternatively, the slider 28 may need to be raised to the locked position of FIG. 6C to move the bolt 16 into the retracted, disengaged position.

The retaining mechanism 31 comprises a compression spring 35 and ball 37 retained within a housing 47 adjacent the slider 28. The compression spring 35 biases the ball 37 outwards from the housing 47 into a locking position. When the slider 28 is in the position at the top of the slot 29 shown in FIG. 6C, the retaining mechanism 31 holds the slider 28 in a locked position in which the restoring force of the compression spring 35 pushes the ball 37 into an indent 39 in the slider 28 to retain the slider 28 in the raised position and the bolt 16 in the retracted, disengaged position.

Figure 7A:
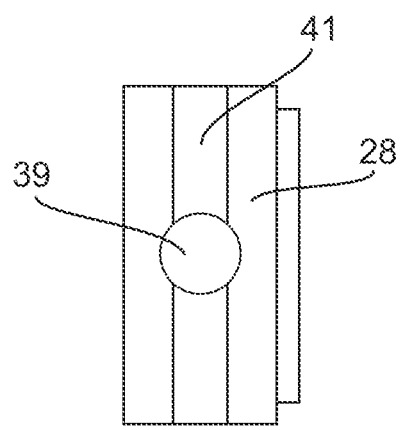
FIGS. 7A to 7C show schematic side, end and front views, respectively, of the slider of FIGS. 6A to 6C.
Figure 7B:
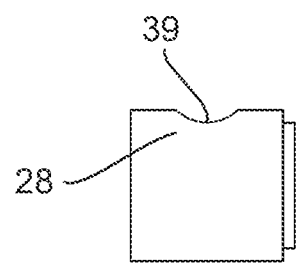
Figure 8:
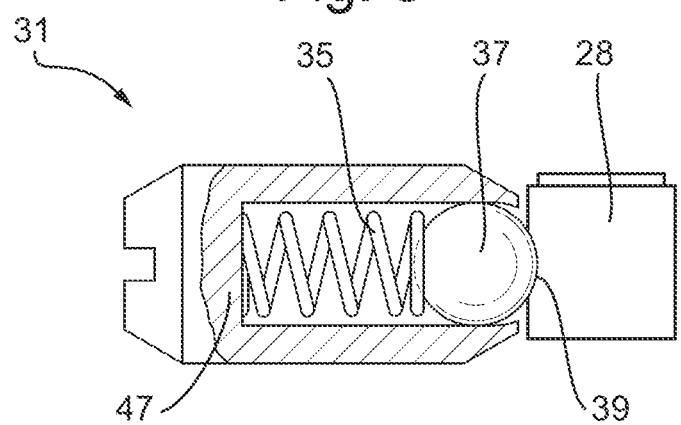
FIG. 8 shows a cross-sectional view of the slider and retaining mechanism of FIG. 6C.

FIG. 7A shows a side view of the slider 28 and FIG. 7B shows an end view of the slider 28. FIG. 8 provides a cross-sectional view of the ball 37 received within the indent 39. A guiding groove 41 is provided between the indent 39 and the end of the slider 28 to receive the ball 37 as the slider 28 moves into the locked position. At least a portion of the guiding groove 41 may be deeper than the rest of the side surface 43 of the slider 28 but shallower than the indent 39 to help the slider 28 move into the locked position. The guiding groove 41 may be inclined from the level of the side surface 43 towards the indent 39.

Figure 6A:
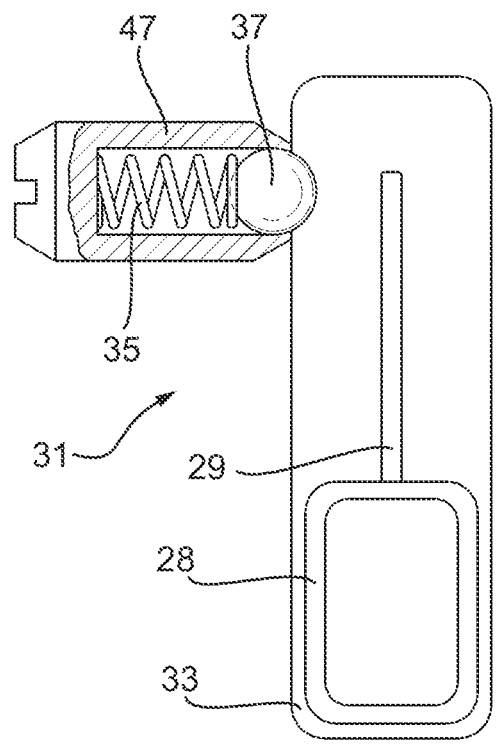
FIGS. 6A to 6C show a schematic front view of a slider with a cross-sectional view of a retaining mechanism for the latch mechanism of FIG. 3A.
Figure 6B:
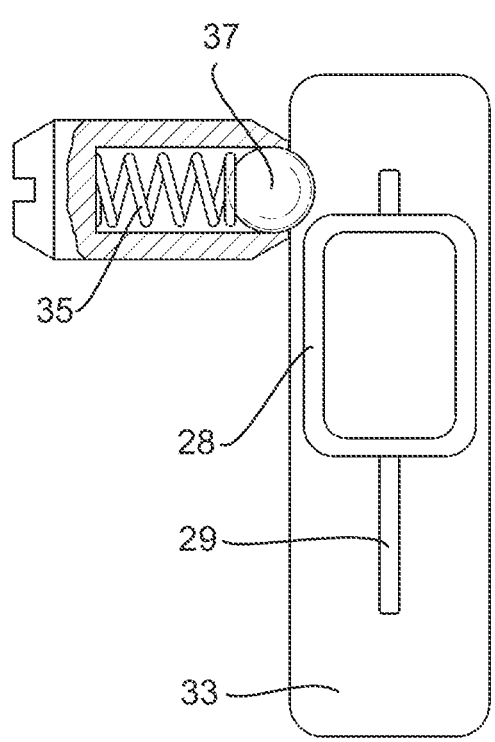
Figure 6C:
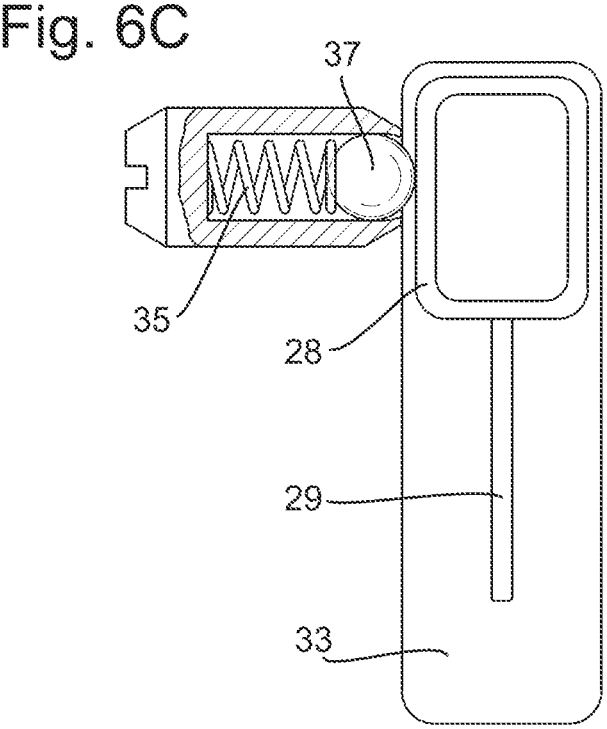
Figure 7C:
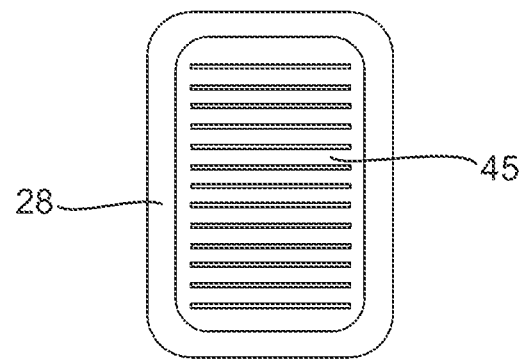

As the slider 28 moves into the locked position of FIG. 6C, contact between the guiding groove 41 and the ball 37 pushes the ball 37 away from the slider 38 to compress the spring 35. Once the indent 39 reaches the ball 37, the spring 35 pushes the ball 37 into the indent 39 and the restoring force of the spring 35 retains the ball 37 in the indent 39 to retain the slider 28 in the locked position. To move the slider 28 out of the locked position and into the position of FIG. 6B so that the bolt 16 can move into the extended, engagement position, for example by the force of gravity, the slider 28 can be pushed downwards in order to move the ball 37 into the housing 33 to compress the spring 35 and decouple the ball 37 and indent 39 to free the slider 28 from the retaining mechanism 31. FIG. 7C shows a front view of the slider 28 with a grip pattern 45 to allow the slider 28 to be easily moved along the slot 29 by hand.

The latch mechanism 14 allows the galley insert 10 to be securely fastened to the support structure 12 to prevent unwanted movement of the galley insert 10 during flight. The latch mechanism 14 also makes it easier and quicker to mount and couple a galley insert to a support structure 12, such as a galley worktop 12, because the attachment bolt 16 automatically falls into place in the opening 18 in the support structure 12 when the bolt 16 is aligned with the opening 18 in the support structure 12. The bolt 16 being integrated with the insert 10 avoids the need for separate screws to be inserted from beneath the galley worktop 12 to secure the insert 10, and does not require the openings 20, 18 to be visible to a technician when installing the insert 10.

Adding a fastener 36 to the lower end of the bolt 16 when the bolt 16 is in place in the support structure opening 18 can also be done more easily than inserting a screw from underneath the support structure 12 because the ends of the bolts 16 protruding from the support structure 12 can be easily located, for example by touch.

The latch mechanism 14 can be more easily and quickly disengaged to allow for easier and faster removal of the galley insert for cleaning, maintenance or replacement. The bolts 16 can be easily retracted from the support structure openings 18 using the slider 28, and can then be retained in the disengaged position by the retaining mechanism 31. The galley insert 10 is then ready to be removed from the support structure 12.

In an alternative embodiment, referring to FIGS. 9A to 15, a galley insert 50, such as the galley insert 2 of FIG. 1, is secured to a galley support structure 52, such as the galley worktop 4, by one or more spring-loaded latch mechanisms 54. As in the embodiment of FIG. 2, the latch mechanism 54 may comprise at least a first latch element 56 and a second latch element 58, as shown in FIGS. 10A-D. At least one of the first and second latch elements 56, 58 may be integrated with the insert 50 or the support structure 52. In this embodiment, the first latch element 56 is integrated with the insert 50 and the second latch element 58 is integrated with the support structure 52. The first latch element 56 and the second latch element 58 automatically engage with each other when the insert 50 is moved into a latching position on the support structure 52 to couple the insert 50 to the support structure 52.

Referring to FIGS. 9A and 10A to 11, the first latch element 56 may comprise a flange 56 at the base or bottom surface 60 of the insert 50, and the second latch element 58 may comprise a hook 58 extending upwards from a surface 62 of the support structure 52. The flange 56 may extend downwards from the base 60 or be built into the base 60, for example as part of a notch in the base 60.

The insert 50 can be coupled to the support structure 52 by bringing the flange 56 into engagement with the hook 58, as demonstrated in FIGS. 10A-D. Although this embodiment of the latch mechanism 54 uses a hook 58 and a flange 56, it will be appreciated by the skilled person that other suitable types of complementary latch features may be used for the first and second latch elements 56, 58.

Figure 10A:
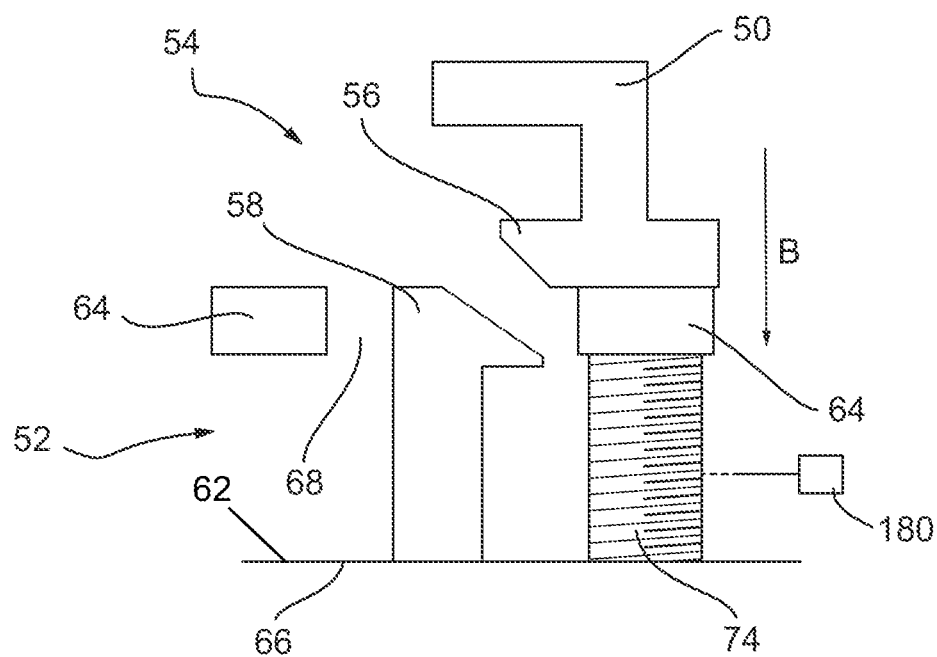
FIGS. 10A to 10D show schematic views of a latch mechanism for the galley insert of FIGS. 9A to 9C.

With particular reference to FIG. 10A, in the illustrated embodiment the galley support structure 52 comprises a movable plate 64 arranged above a fixed base 66. The plate 64 is movable relative to the base 66 and receives the insert 50 such that the plate 64 is located between the base 66 and the insert 50 when the insert 50 is mounted on the support structure 52. The plate 64 can be lowered towards the base 66 (relative to the direction of gravity). The hook 58 extends upwards from an upper surface 62 of the base 66. The plate 64 may comprise an opening 68 which can receive the hook 58 when the plate 64 is moved towards the base 66 to allow the hook 58 to pass through the plate 64 to engage with the flange 56 of the insert 50.

Figure 9B:
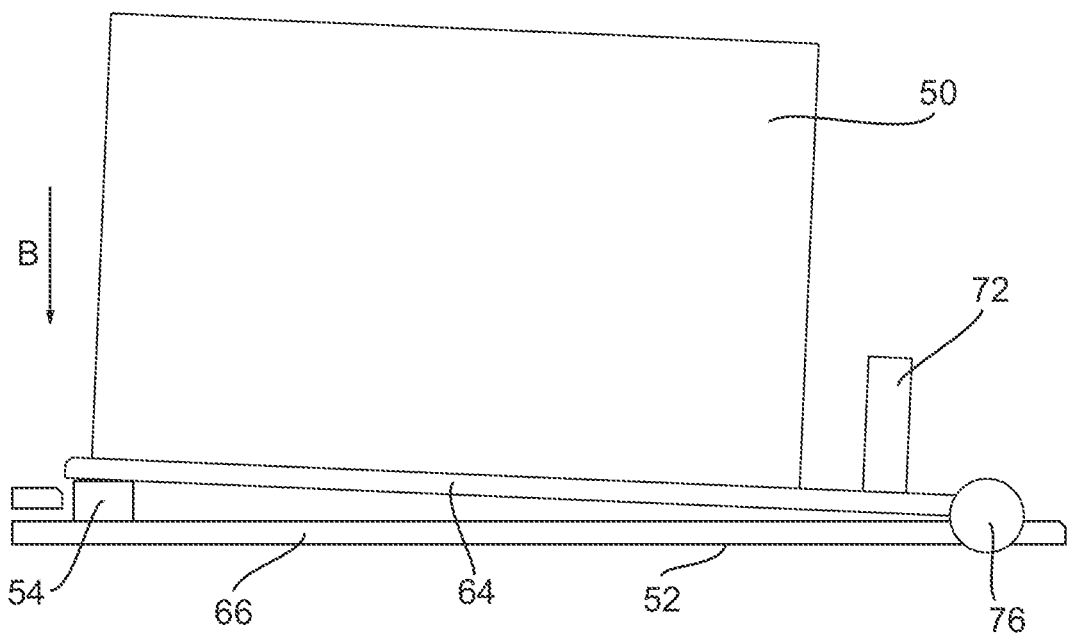
Figure 9C:
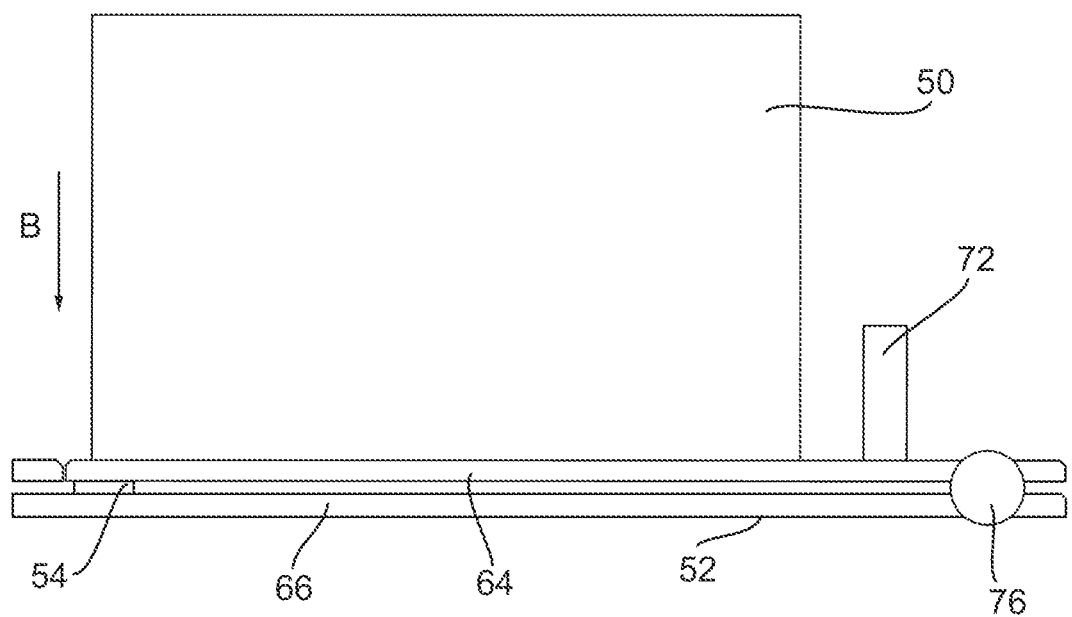

As shown in FIGS. 9A-C, the insert 50 can be mounted on the plate 64 when the plate 64 is in a raised position relative to the base 66 (FIG. 9A). The insert 50 can be slid backwards on the plate 64 in direction A towards the rear 70 of the support structure or worktop 52, for example for connection with electrical connections 72. The insert 50 and plate 64 may then be lowered together in direction B towards the base 66 (FIG. 9B) to allow the first and second latch elements 56, 58 to engage with each other (FIG. 9C). Engagement of the first and second latch elements 56, 58 retains the insert 50 and plate 64 in the lowered position of FIG. 9C relative to the base 66.

Figure 10B:
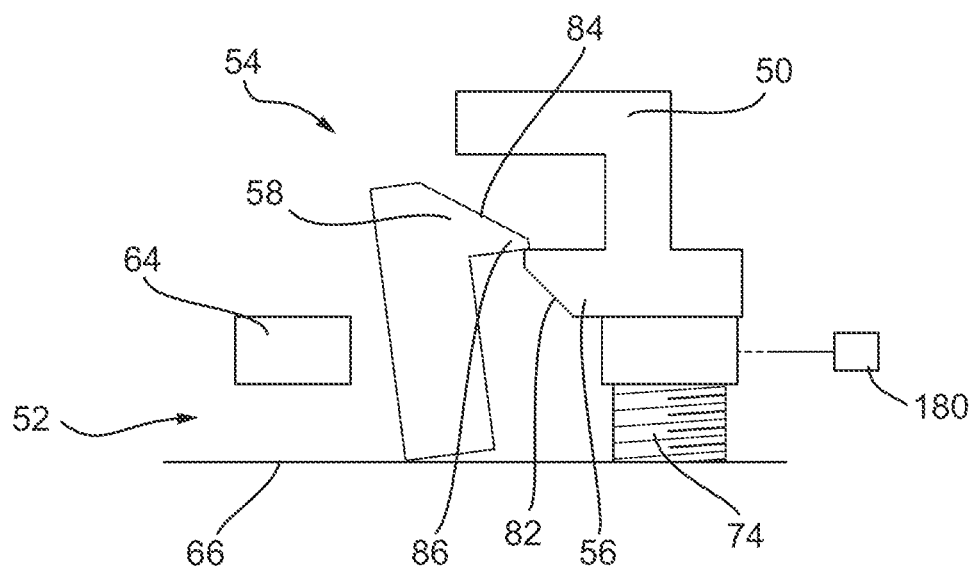
Figure 10C:
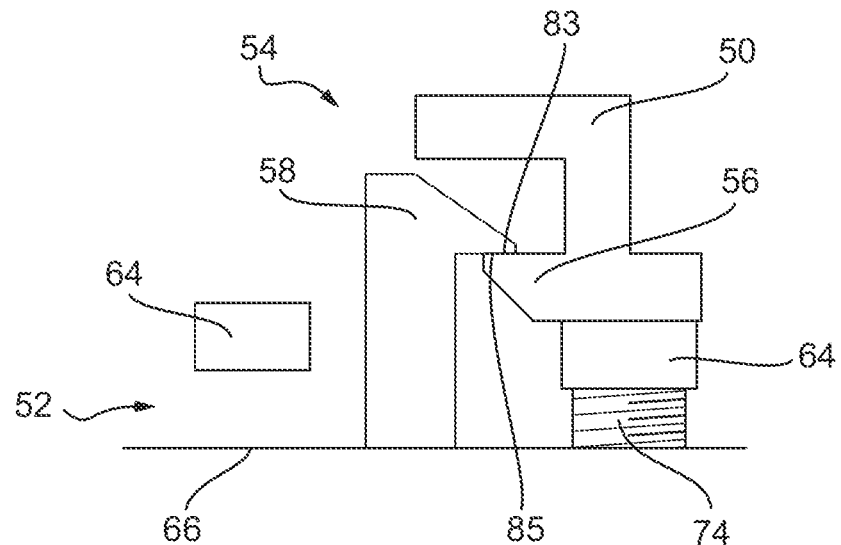

The plate 64 may be biased to the raised position by a compression spring 74 positioned between the plate 64 and base 66, such as a coil spring as shown in FIGS. 10A-C. Lowering the insert 50 and plate 64 in direction B may be achieved by exerting a downwards force on the insert 50 or plate 64 to overcome the spring force. Biasing the plate 64 to the raised position facilitates the mounting and dismounting of the insert 50, as discussed further below. The compression spring 74 may be located adjacent the latch mechanism 54 and may be coupled to one or both of the plate 64 and base 66.

The plate 64 may be pivotally coupled to the base 66, for example at a hinge 76 located adjacent the rear 70 of the support structure 52. This allows the plate 64 to be pivoted up and down relative to the base 66.

Figure 10D:
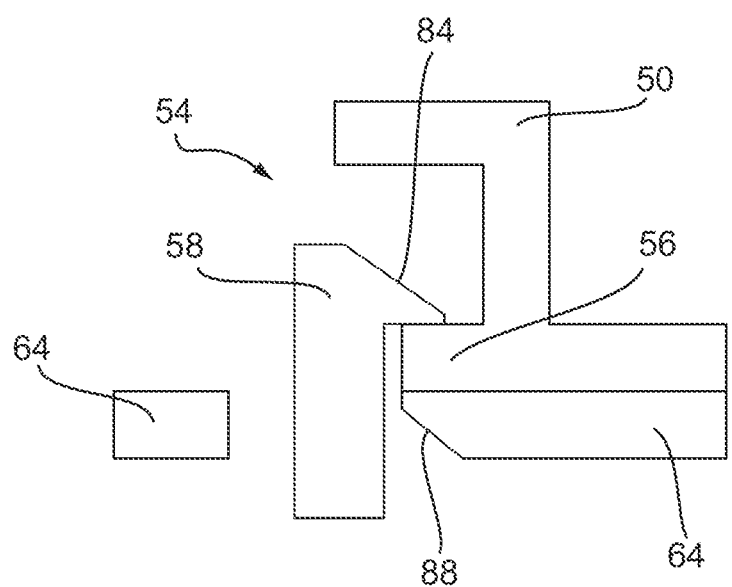
Figure 11:
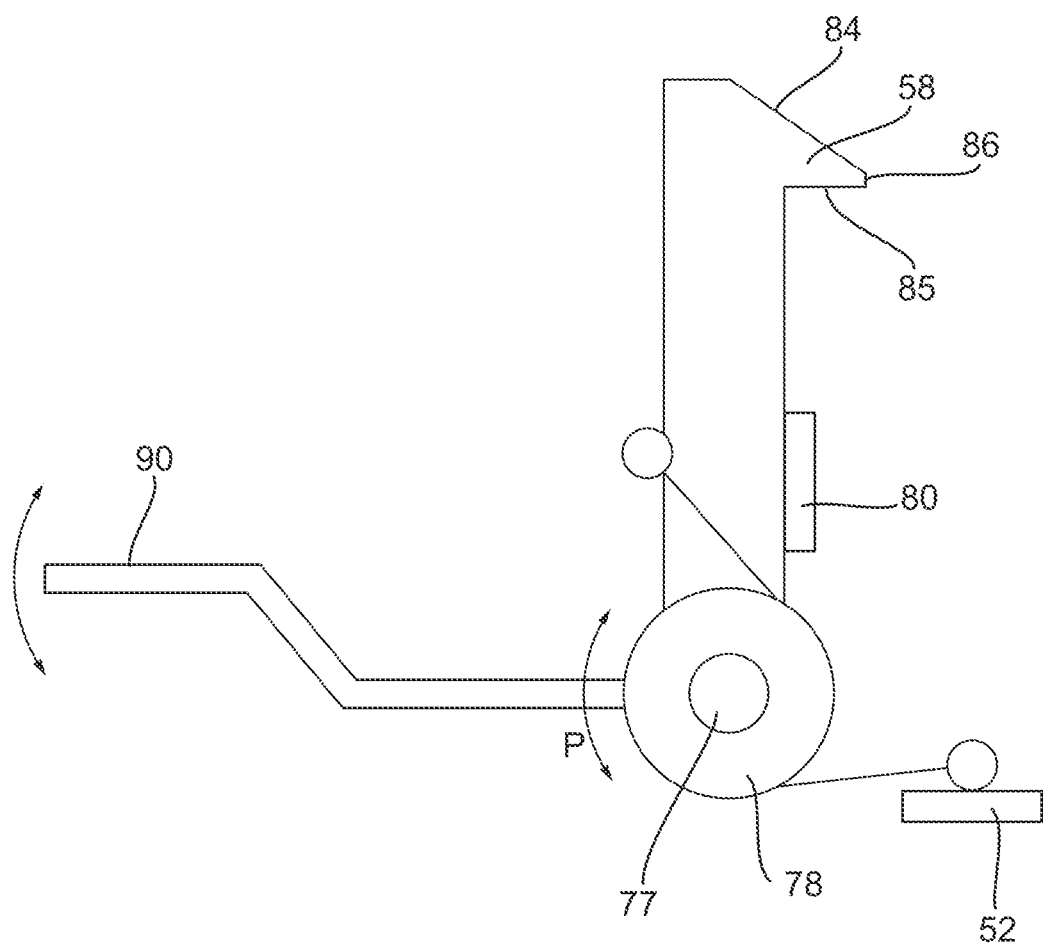
FIG. 11 shows a schematic view of part of the latch mechanism of FIGS. 10A to 10D.

The latching mechanism 54 is configured such that the first and second latching elements 56, 58 automatically engage when the insert 50 and plate 54 are lowered into a latching position relative to the base 66. In this embodiment, the flange 56 of the insert 50 is fixed relative to the insert 50. The hook 58 of the support structure 52 is pivotable relative to the base 66 about a pivot point or axis 77 between an engagement position as shown in FIGS. 10C, 10D and 11 and a disengaged position as shown in FIG. 10B.

The latching mechanism 54 is arranged such that the hook 58 needs to be moved to the disengaged position for the flange 56 to be able to engage or disengage the hook 58. The hook 58 can retain the flange 56 when in the engaged position. The hook 58 may be biased to the engagement position to ensure the insert 50 is securely coupled to the support structure 52 when the flange 56 and hook 58 are engaged. As shown in FIG. 11, the hook 58 may be biased to the engagement position by a spring 78, for example a torsion spring, coupled between the support structure 52 and the hook 58. A fixed latch support 80 may be coupled to the base 66 to abut the hook 58 when the hook 58 is in the latching position. The latch support 80 limits the range of movement of the hook 58 in direction P about the pivot point 77 under the bias force of the spring 78.

With reference to FIGS. 10A-C, when moving the insert 50 into the latching position to engage the flange 56 and hook 58, the flange 56 is lowered towards the hook 58 in the engagement position to bring a surface 82 of the flange 56 into contact with a complementary surface 84 of the hook 58. To lower the flange 56 towards the hook 58, a downward force can be exerted on the insert 50 to push the plate 64 towards the base 66 against the force of the compression spring 74.

The contact surfaces 82, 84 are arranged such that a downward force from the contact surface 82 of the flange 56 exerted on the contact surface 84 of the hook 58 causes the hook 58 to pivot about the pivot point 77 against the bias force of the spring 78 into the disengaged position to allow the flange 56 to be lowered past the tip 86 of the hook 58 (FIG. 10B). For example, at least one of the contact surfaces 82, 84 of the flange 56 and the hook 58 may be bevelled/chamfered or rounded to allow the contact surface 82 of the flange 56 to slide over the contact surface 84 of the hook 58 and exert force on the hook 58 to oppose the bias force of the spring 78. Alternatively or additionally, with reference to FIG. 10D, a chamfered/bevelled or rounded surface 88 may be provided on the plate 64 to interact with the contact surface 84 of the hook 58 and exert the necessary force on the hook 58 to pivot the hook 58 into the disengaged position.

Once the flange 56 has passed the tip 86 of the hook 58, the hook 58 and flange 56 are aligned with the insert 50 in the latching position on the support structure 52. The hook 58 can be automatically pivoted back into the engagement position by the spring 78 so that the hook 58 is in latching engagement with the flange 56 (FIGS. 10C and 10D). A downwardly facing surface 85 of the hook 58 abuts an upwardly facing surface 83 of the flange 56 and prevents the flange 56, insert 50 and plate 64 from rising upwards, for example by the force of the compression spring 74. The latching mechanism 54 thereby secures the insert 50 to the base 66, and retains the insert 50 and plate 64 in a latching position with respect to the base 66 with the compression spring 74 in a compressed configuration.

In order to release the latch mechanism 54 to allow the insert 50 to be removed from the support structure 52, a control mechanism 90 is provided to move the second latch element 58 from the engagement position to the disengaged position to disengage the first and second latch elements 56, 58. The control mechanism 90 may be integrated with the latch mechanism 54. With reference to FIG. 11, a lever 90 is coupled to the hook 58 to allow the hook 58 to be pivoted in direction P about the pivot point 77 against the bias force of the spring 78. By operating the lever 90, the hook 58 can be moved from the engagement position to the disengaged position to allow the flange 56 to be disengaged from the hook 58. To disengage the flange 56 from the hook 58, the hook 58 is pivoted to allow the flange 56 to rise past the tip 86 of the hook 58.

Once the flange 56 and hook 58 are disengaged, the plate 64 and insert 50 can automatically move upwards relative to the base 66 under the restoring force of the compression spring 74. The lifting of the plate 64 above the base 66 moves the insert 50 into a position relative to the base 66 such that releasing the lever 90 allows the hook 58 to pivot back into the engagement position without being engaged with the flange 56. The insert 50 can then be removed from the support structure 52, such as by sliding the insert 50 forwards, away from the rear 70 and electrical connections 72 and over the hook 58.

The lever 90 may also be operated when moving the insert 50 to the latching position to pivot the hook 58 to the disengaged position for engaging the flange 56 and hook 58. This can be instead of or in combination with exerting force on the contact surface 84 of the hook 58 to pivot the hook 58 to the disengaged position.

FIG. 12 shows a cross-sectional view of a front portion of the galley insert 50 from above. The lever 90 extends out from the hook 58 beneath the insert 50 and plate 64 to a position in front of the insert 50, i.e., beyond the front surface 92 of the insert 50, to provide easy access to the lever 90. This allows the latch mechanism 54 to be quickly and easily released for quick and easy removal of the insert 50. The latch mechanism 54 can be easily disengaged from the front 92 of the insert 50 by depressing the lever 90 to enable the insert 50 to be removed without requiring the removal of any screws from beneath the insert and support structure 52, as would be required for conventional insert systems. The lever may alternatively be arranged so as to extend out from the insert 50 to another easily accessible location, such as the side or top of the insert 50, for example using a suitable linkage mechanism to allow control of the hook 58 beneath the insert 50. The skilled person would understand how such a linkage mechanism may be provided.

Figure 13A:
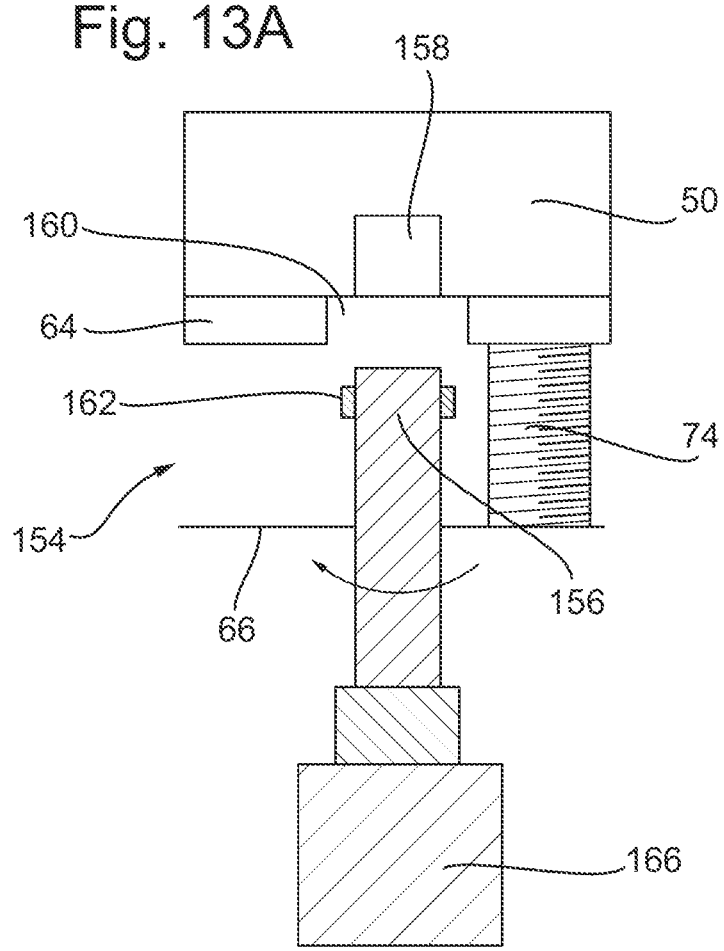
FIGS. 13A and 13B show schematic cross-sectional views of the galley insert of FIGS. 9A to 9C.
Figure 13B:
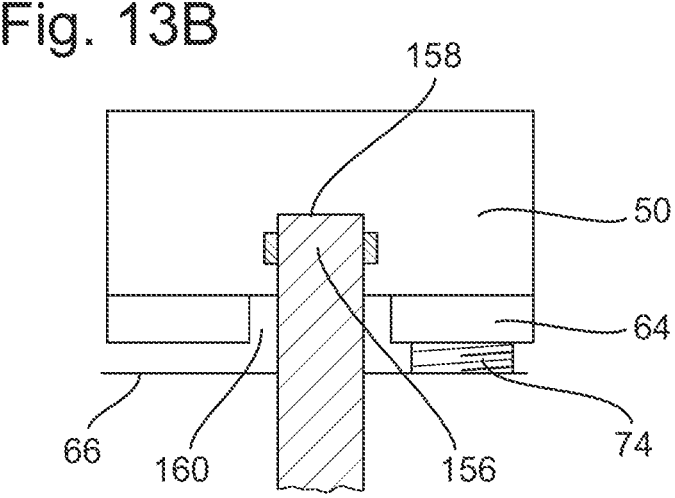
Figure 14:
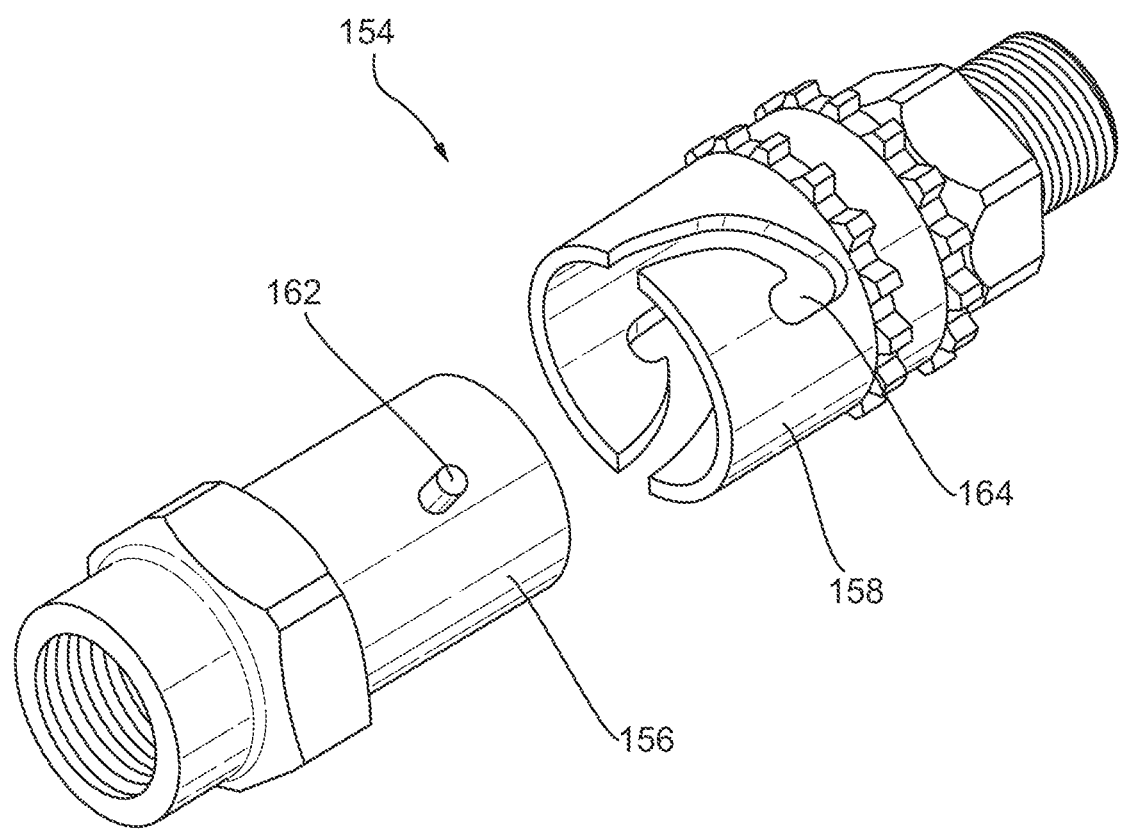
FIG. 14 shows an example bayonet-type connector for use with the galley insert of FIGS. 9A to 9C.

Referring to FIGS. 12 to 14, the latch mechanism 54 may be a primary latch mechanism 54 and one or more secondary latch mechanisms 154 may also be provided. The secondary latch mechanism(s) 154 may be used to provide redundancy in case the primary latch mechanism 54 fails. In this embodiment, each secondary latch mechanism 154 may comprise a bayonet-type connector, as illustrated in FIGS. 13A, 13B and 14. However, other suitable types of connectors may be used for the secondary latch mechanisms 154, as will be appreciated by the skilled person.

The bayonet connectors 154 of the depicted embodiment each comprise a male portion 156 that mates with a female portion 158. In this embodiment, the male portions 156 are coupled to (or integrated within) the base 66 of the support structure 52. The male portions 156 can be received through openings 160 in the plate 64 when the plate 64 is lowered towards the base to engage the primary latch mechanism 54, as shown in FIG. 13B. The corresponding female portions 158 of the bayonet connectors 154 are coupled to (or integrated within) the insert 50. The female portions 158 receive the corresponding male portions 156 when the insert 50 is lowered with the plate 64 towards the base 66. In other embodiments, the base 66 may comprise the female portions 158 and the insert 50 may comprise the male portions 156.

Once the primary latch mechanism 54 has been engaged to couple the insert 50 to the support structure 52, the bayonet connectors 154 can be engaged by rotating the male portions 156 such that pins 162 of the male portions 156 move along corresponding slots 164 in the fixed female portions 158. Due to the shape of the slots 164, shown in FIG. 14, rotation of the male portions 156 cause the male and female portions 156, 158 to be pulled closer together. If more than one bayonet connector 154 is present, all bayonet connectors 154 should be actuated substantially simultaneously. When the secondary latch mechanism 154 is actuated, the female portions 158 of the insert 50 on the movable plate 64 are pulled into closer engagement with the male portions 156 of the base 66, which causes the plate 64 to be moved further downwards towards the base 66. This further compresses the compression spring 74. In other embodiments, the female portions 158 of the bayonet connectors 154 are rotated and the male portions 156 are held fixed.

As shown in FIG. 12, the bayonet connectors 154 may each comprise a lever 160 extending out beyond the front 92 or side 94 of the insert 50 which allows rotation of the bayonet connectors 154 to be carried out manually. Alternatively, or in addition, the bayonet connectors 154 may be rotated by an electronic actuator 166.

With reference to FIGS. 13A and 15, an electronic actuator 166, such as an electronic motor, may be coupled to each secondary latch mechanism 154 to engage the secondary latch mechanism(s) 154 once the primary latch mechanism 54 is engaged. The electronic actuators 166 may be in communication with a controller 168 coupled to a power supply 170 to power the controller 168 and actuators 166. The controller 168 can send actuation signals 172 to activate the actuators 166 to engage or disengage the secondary latch mechanism 154, such as by rotating the bayonet connectors 154. The controller 168 may be in communication with a control interface 174 provided in the galley to allow a technician to control the actuators 166 via the controller 168. Alternatively, or additionally, the controller 168 may be in communication with a control interface 176 provided as part of the insert 50 (which can be connected to a power supply via electrical connections 72) to allow a technician to control the actuators 166 via the controller 168.

With additional reference to FIGS. 10A and 10B, the controller 168 may additionally or alternatively be configured to automatically control the actuators 166 to engage the secondary latch mechanism 154 in response to a sensor signal 178 from a sensor 180. The sensor 180 may provide feedback to the controller 168 with regard to the status of the primary latch mechanism 54. The sensor 180 may be arranged to sense the position of the plate 64, for example relative to the base 66. The sensor 180 may be an optical sensor or capacitive sensor, for example.

As discussed above, the primary latch mechanism 54 is engaged by moving the insert 50 into a latching position on the support structure 52 in which the flange 56 of the insert 50 is aligned with the hook 58, whereupon the hook 58 and flange 56 automatically engage with each other. The insert 50 is brought into the latching position by lowering the plate 64 towards the base 66, so the position of the plate 64 above the base 66, as determined by the sensor 180, can indicate whether the primary latch mechanism 54 is engaged or disengaged.

The sensor 180 may be configured to send the sensor signal 178 to the controller 168 when the sensor 180 detects that the plate 64 is in a position relative to the base 66 in which the latch mechanism primary 54 automatically engages to couple the insert 50 to the support structure 52. Upon receipt of the sensor signal 178, the controller 168 may send an actuation signal 168 to each of the actuators 166 for the secondary latch mechanisms 154 to cause the secondary latch mechanisms 154 to engage. The secondary latch mechanisms 154 thereby automatically engage once the primary latch mechanism 54 is engaged.

The automation of the secondary latch mechanism 154 helps to save time and effort during installation of the insert 50 in an aircraft galley. Manual override of the secondary latch mechanism 154 can also be provided, for example via levers 160, so that the secondary latch mechanism 154 can still be actuated when no electrical power is available.

The terms "side", "beside", "front", "rear", "top", "bottom", "above" and "beneath" as used herein are in relation to the insert when installed for use in an aircraft galley.

Although certain advantages have been discussed in relation to certain features above, other advantages of certain features may become apparent to the skilled person following the present disclosure.

What is claimed is:

1. A galley insert system for an aircraft galley, the system comprising:
    a galley support structure;
    a galley insert configured to be coupled to the galley support structure;
    a latch mechanism for coupling the galley insert to the galley support structure, the latch mechanism configured to automatically engage to couple the galley insert to the galley support structure when the galley insert is moved into a latching position on the galley support structure,
    wherein the latch mechanism comprises a control mechanism configured to be actuated to disengage the latch mechanism, and
    wherein the latch mechanism comprises:
        a first latch element; and
        a second latch element;
        wherein the first latch element is configured to engage with the second latch element to couple the galley insert to the galley support structure,
        wherein the first latch element includes a flange with a first contact surface,
        wherein the second latch element includes a hook with a second complementary contact surface, and
        wherein a downward force from the first contact surface of the flange when exerted on the second complementary contact surface of the hook causes the hook to pivot about a pivot point against a bias force of a spring into a position to allow the flange to be lowered past a tip of the hook.

2. The galley insert system of claim 1, wherein the latch mechanism is configured to couple a base of the galley insert to the galley support structure, and wherein at least a portion of the control mechanism is positioned beside the galley insert, on a side or front surface of the galley insert, on top of the galley insert, or in front of the galley insert.

3. The galley insert system of claim 1, wherein the latching position comprises the first latch element being aligned with the second latch element.

4. The galley insert system of claim 3, wherein the first latch element is integrated with the galley insert and the second latch element is integrated with the galley support structure.

5. The galley insert system of claim 3, wherein at least one of the first latch element and the second latch element is movable between an engagement position and a disengaged position and is biased to the engagement position.

6. The galley insert system of claim 3, wherein the first latch element is configured to automatically move under gravity into engagement with the second latch element when the first latch element is aligned with the second latch element.

7. The galley insert system of claim 3, wherein the second latch element is movable between an engagement position and a disengaged position and is biased to the engagement position by a spring force, the second latch element configured to move from the engagement position to the disengaged position to receive and be aligned with the first latch element when the insert is moved into the latching position, and then revert to the engagement position under the spring force to retain the first latch element to engage the latch mechanism.

8. The galley insert system of claim 7, wherein the latch mechanism is configured such that, when the insert is moved into the latching position on the support structure, the first latch element moves the second latch element from the engagement position to the disengaged position.

9. The galley insert system of claim 7, wherein the control mechanism is configured to be actuated to move the second latch element against the spring force from the engagement position to the disengaged position to disengage the latch mechanism, the latch mechanism configured such that the first latch element is automatically released from the second latch element when the second latch element moves to the disengaged position.

10. The galley insert system of claim 1, wherein the insert is biased by the support structure from the latching position to an unlatched position for removal of the insert from the support structure such that, when the latch mechanism is disengaged, the support structure automatically moves the insert to the unlatched position.

11. The galley insert system of claim 1, wherein the latch mechanism comprises a retaining mechanism configured to selectively prevent the latch mechanism automatically engaging when the insert is in the latching position.

12. The galley insert system of claim 1, wherein the latch mechanism is a primary latch mechanism, and further comprising at least one secondary latch mechanism, wherein the at least one secondary latch mechanism is configured to be engaged after the primary latch mechanism has engaged, and wherein the at least one secondary latch mechanism is configured to automatically engage in response to a sensor signal indicating that the primary latch mechanism has engaged.

13. A method of operating the galley insert system of claim 1, the method comprising:
   placing the galley insert on the galley support structure;
   moving the galley insert into the latching position on the galley support structure; and
   automatically engaging the latch mechanism to couple the galley insert to the galley support structure.

14. The method of claim 13, wherein moving the galley insert into the latching position on the galley support structure comprises aligning the first latch element with the second latch element such that the first latch element and second latch element automatically engage to couple the galley insert to the galley support structure, wherein the first latch element is integrated with the galley support structure and the second latch element is integrated with the galley insert.

15. The method of claim 14, wherein aligning the first latch element with the second latch element comprises moving the second latch element against a spring bias force.

* * * * *